United States Patent [19]

Aso et al.

[11] 4,190,438

[45] Feb. 26, 1980

[54] AMORPHOUS MAGNETIC ALLOY

[75] Inventors: Koichi Aso; Satoru Uedaira; Shigeyasu Ito; Hidemasa Tamura; Yoshimi Makino, all of Yokohama, Japan

[73] Assignee: Sony Corporation, Tokyo, Japan

[21] Appl. No.: 940,172

[22] Filed: Sep. 7, 1978

[30] Foreign Application Priority Data

Sep. 12, 1977 [JP] Japan ................................ 52-109746

[51] Int. Cl.$^2$ .............................................. C22C 38/02
[52] U.S. Cl. ............................... 75/123 B; 75/123 D; 75/123 E; 75/123 K; 75/123 L; 75/123 R
[58] Field of Search ........................ 148/31.55, 31.57; 75/122, 123 B, 123 K, 123 L, 123 D, 123 R, 123 E

[56] References Cited

U.S. PATENT DOCUMENTS

| | | | |
|---|---|---|---|
| 3,856,513 | 12/1974 | Chen et al. | 75/123 B |
| 4,056,411 | 11/1977 | Chen et al. | 148/31.57 |

FOREIGN PATENT DOCUMENTS

2405036  8/1974  Fed. Rep. of Germany ............. 75/122

Primary Examiner—Arthur J. Steiner
Attorney, Agent, or Firm—Hill, Van Santen, Steadman, Chiara & Simpson

[57] ABSTRACT

An amorphous magnetic alloy consists of 2 to 20 at % (atomic percent) of ruthenium atoms; 10 to 30 at % of atoms of at least one amorphous forming element selected from the group consisting of phosphorus, carbon, silicon, boron and germanium; and iron atoms as the predominant component of the balance.

4 Claims, 5 Drawing Figures

FIG.5

AMORPHOUS MAGNETIC ALLOY

BACKGROUND OF THE INVENTION

1. Field of the Invention

This invention relates to an amorphous magnetic alloy, and more particularly to an amorphous magnetic alloy suitable as material for a magnetic head for a recording and/or reproducing apparatus.

2. Description of the Prior Art

As high permeability magnetic material, there are hitherto known a polycrystalline Fe-Ni alloy, a polycrystalline Fe-Al-Si alloy, a single-crystalline ferrite and a polycrystalline ferrite. However, from the viewpoint of material for the magnetic head, the Fe-Ni alloy (Permalloy group) has so low saturation magnetic flux density as at most 8000 gauss, and it is inferior in wear resistance. Moreover, its permeability is remarkably reduced in the high frequency region. On the other hand, the Fe-Al-Si alloy (Sen-dust) has a higher saturation magnetic flux density as about 10000 gauss, and further it is superior in wear resistance. However, the Fe-Al-Si alloy cannot be plasticly worked at all. And the saturation magnetic flux density of ferrite is at most 4500 gauss. Higher saturation magnetic flux density than 4500 gauss cannot be expected for ferrite because of its magnetic interaction.

As above described, the conventional high permeability magnetic materials have both merits and demerits. It is difficult to use them as materials for magnetic heads able to cope with high-density recording and high-quality recording to be expected here-after.

Generally, it is considered that constituent atoms are not latticed in an amorphous metal, and so it has not crystalline magnetic anisotropy. From this viewpoint, amorphous metal can be expected to be a magnetically soft material which has a low coercive force and high permability. However, an amorphous material containing, for example, only Fe as metal element, or containing Fe as the main component and Co and/or Ni as residual components, has a very large magnetostriction constant λ. Accordingly, it has the disadvantage that its initial permeability is low from the relation-ship of $\mu \propto 1/\lambda\sigma$ ($\sigma$: internal and external stress). When such material is annealed at a suitable temperature below the crystallization temperature, its permeability is much increased. However, when such material is used as material for magnetic head, a head tip should be fixed with molded resin. The head tip is much tensioned with the hardening resin. As the result of the combination of such tension and magnetostriction coefficient, induced magnetic anisotropy is generated in the head tip. Accordingly, the permeability of the head tip material becomes again low, resulting in the decrease of the output of the magnetic head. The reason is considered to be that the magnetostriction coefficient of the amorphous metal containing mainly Fe is large. Accordingly, in order to obtain a magnetic head material whose magnetic characteristics are not deteriorated by working processes, its magnetostriction coefficient should be as low as possible.

SUMMARY OF THE INVENTION

Accordingly, it is an object of this invention to provide an improved amorphous magnetic alloy which overcomes the above described demerits of the conventional amorphous magnetic alloy having high permeability.

Another object of this invention is to provide an amorphous magnetic alloy which is deteriorated less with working process and resin molding.

In accordance with one aspect of this invention, an amorphous magnetic alloy consists of 2 to 20 at % (atomic percent) Ru (ruthenum), 10 to 30 at % of atoms of at least one amorphous forming element selected from the group of P (phosphorus), C (carbon), Si (silicon), B (boron) and Ge (Germanium), and Fe (iron) as the predominant component of the balance.

Various other objects, advantages and features of the present invention will become readily apparent from the ensuing detailed description, and the novel features will be particularly pointed out in appended claims.

DESCRIPTION OF THE PREFERRED EMBODIMENTS

These inventors have found out that the magnetostriction coefficient of an amorphous magnetic alloy is much reduced by adding Ru atoms within the range of 2 to 20 at % to an amorphous material containing at least one amorphous forming element of P, C, Si, B and Ge, and Fe as predominant component of the balance.

First, there will be described the reason why Ru atoms are added within the range of 2 to 20 at %. When Ru atoms are added at a higher concentration than 20 at %, the obtained amorphous magnetic alloy does not exhibit ferromagnetism at room temperature, that is, the magnetic Curie point or Curie temperature is lower than the room temperature, or the saturation magnetic flux density is remarkably reduced at room temperature. And when Ru atoms are added at a lower concentration that 2 at %, the magnetostriction coefficient is not effectively decreased.

It is preferable that the concentration of the amorphous forming element is within the range of 10 to 30 at %. It is difficult to obtain amorphous state beyond the above range. It is more preferable that the concentration of the amorphous forming element is within the range of 15 to 28 at %.

In an amorphous magnetic alloy according to this invention, a part of the Ru atoms may be substituted with Mo (molybdenum) Mn (manganese), V (vanadium), Al (Aluminum) or Cr (chromium) in such a manner that the concentration of the total of the Ru atoms and above described substitution atoms is within the range of 2 to 20 at %. Such substitution atoms function to effectively decrease the magnetostriction coefficient. Particularly, Al atoms function to raise the magnetic Curie Point and to lessen the decrease of the saturation magnetic flux density. It is preferable that the content of the Al atoms is within the range of 0.1 to 15 at % for the whole amorphous magnetic alloy. When the content of the Al atoms is larger than 15 at %, it is difficult to obtain the amorphous state. When the content of the Al atoms is less than 0.1 at %, the above-described effects become poor.

The above-described substitution atoms Mo, Mn, V or Cr may be contained in almost the same concentration as the Ru atoms. The effect due to the addition of the Ru atoms is not detriorated by such addition of the substitution atoms.

When the contents of P, C, Si, B and Ge are expressed by:
$P_v C_w Si_x B_y Ge_z$, where $v+w+x+y+z=1$,
it is preferable that they are selected within the following ranges:
$v \leq 1$, $w \leq 0.7$, $x \leq 0.7$, $y \leq 1$, and $z \leq 0.7$ The thus manufactured amorphous magnetic alloy has a high Vickers hardness as 850 to 950 Hv or more, and a high specific resistance as 130 to 160 $\mu\Omega$-cm. Moreover, it is superior in toughness and workability.

It is preferable that only B atoms, or Si atoms and B atoms be included as the amorphous forming elements in the amorphous magnetic alloy, since they function to raise the crystallization temperature. When the Si atoms and B atoms are included as the amorphous forming elements, it is preferable that their content ratio is within the range of 75/25 to 5/95.

Further, it is preferable that the content of the balance containing predominantly Fe atoms is within the range of 70 to 90 at %. However, a part of the Fe atoms may be substituted with Co and/or Ni atoms (ferromagnetic 3d-transition metal). In this case, the addition of the Co and/or Ni atoms up to the content of about 20 at % for the whole armorphous magnetic alloy does not deteriorate the good characteristic of the amorphous material of this invention.

Next, examples of this invention will be described in comparison with comparison examples.

A roll quenching apparatus which was already proposed in the Japanese Patent Applications No. 22936/1977, No. 22937/1977, No. 109747/1977 and the corresponding U.S. application to the latter by the same assignee, was used for manufacturing amorphous materials. The roll quenching apparatus includes a pair of quenching rolls and a rotary drum member arranged near at least one of the quenching rolls rotating in opposite directions to each other. A melted mixture of raw materials is introduced into the gap between the rolls to be rolled and quenched thereby. A strip or film of amorphous material from the gap between the rolls is guided on the circumferential surface of the rotary drum member to be further cooled thereon. The cooling speed of the roll quenching apparatus is higher. A strong, straight and uniform film of amorphous alloy can be manufactured by the roll quenching apparatus. When the peripheral speeds of the rolls are different from each other, the film from the gap between the rolls tends to one of the rolls rotating at the lower peripheral speed, and thereby the cooling speed is further improved. Of course, a strong amorphous alloy film can be manufactured also in such manner.

Long strips were manufactured by the above described roll-quenching apparatus. Amorphism of the long strips was confirmed by an X-ray diffraction method. Characteristics of the amorphous alloy strip were measured in the below described manner. The measurement results are shown in tables which will be described hereinafter.

For the measurement of the magnetostriction coefficient, a sample piece was cut out from the strip. The surface of the sample piece was ground. Then, the sample piece was punched to obtain a disc having diameter of 5 mm. The disc was cleaned with organic solvent. A foil-type strain guage was attached to the cleaned disc by $\alpha$-cyanoacrylate adhesive, for example, Alon $\alpha$(-tradename). The expansion or contraction of the sample disc was measured in the static magnetic field of about 10 Koe. The magnetostriction constant $\lambda$ was obtained by the following equation:

$$\lambda = \tfrac{2}{3}[(\Delta l/l)\| - (\Delta l/l)\perp],$$

where $(\Delta l/l)\|$ represents the rate of the expansion or contraction of the sample disc when the magnetic field is applied to the sample disc in the direction of the strain gauge, and $(\Delta l/l)\perp$ represents the rate of the expansion or contraction of the sample disc when the magnetic field is applied to the sample disc in the direction normal to the direction of the strain gauge.

For the measurement of the permeability frequency characteristic, a sample piece was cut out from the strip. The surface of the sample piece was ground. Then, the sample piece was punched to obtain several rings having inner diameter of 2 mm and outer diameter of 5 mm. The ring samples were piled in a ring container made of pyrophyllite insulated from each other. Windings were provided on the ring container. The permeabilities for the low frequency region were measured with a Maxwell bridge, and the permeabilities for the high frequency region were measured with a Vector impedance meter. Next, the ring samples were annealed in the atmosphere of hydrogen gas. Then, the permeabilities were measured in the above described manner. And the ring samples in the ring container were molded with resin. A mixture of Pelnox ME-105 and Pelcure HY-309 (tradenames-epoxy resin) manufactured by Japanese Pelnox Co., in ratio of 100:32 was used for the resin molding, and it was hardened at the temperature of 40° C. in 16 hours or at the temperature of 70° C. in 5 hours. After the resin molding, the permeability was again measured.

For the measurement of the magnetism (magnitude $\sigma g$ of spontaneous magnetization and magnetic Curie point Tc), magnetic balance was used in which a nickel rod of high purity was used as a reference sample. The magnetic Curie point was measured at the temperature rise speed of about 5 degrees/min. The value of the magnetic Curie point was obtained from its dependence on the magnetic field.

The crystallization temperature Tcry was measured with a DTA (Differential Thermal Analysis) apparatus. The Vickers hardness was measured with a Vickers hardness tester under the loading condition 200 grams×15 sec of Vickers hardness press element. The specific resistance $\rho$ was measured with a small-sized Wheatstone bridge.

Comparison Example 1

Fe-P alloy, Fe-C alloy and Fe were weighed for obtaining the composition of 80 at % Fe, 13 at % P and 7 at % C, and they were melted in a high frequency furnace to obtain a melted mixture of raw materials. The melted mixture was supplied to the roll quenching apparatus. Thus, a test sample of amorphous material in the form of strip was prepared.

Figure 1:
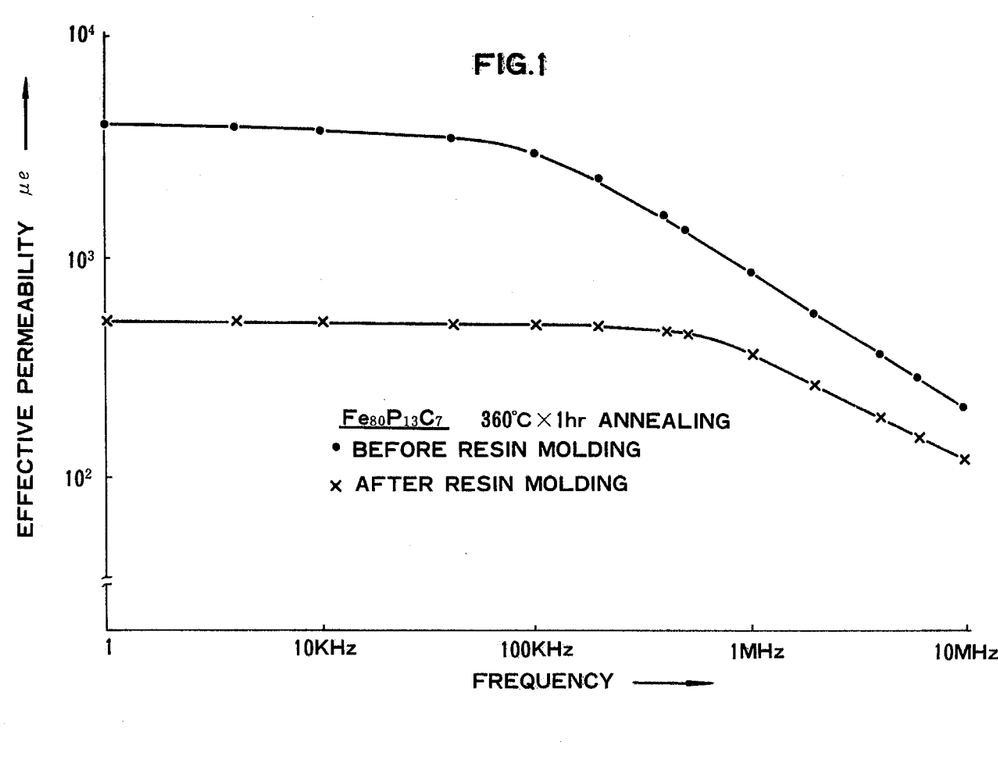
FIG. 1 is a graph showing the dependences of the effective permeability $\mu e$ of an amorphous magnetic material of a comparison example on frequency before and after resin molding.

The magnetostriction coefficient was measured in the above described manner. The result is shown in Table 1. And the permeability was measured in the above described manner. Then, the sample was annealed at the temperature of 360° C. for one hour, and the effective permeability $\mu e$ was measured before and after the resin molding. The change of the effective permeability $\mu e$ due to the resin molding is shown in FIG. 1.

EXAMPLE 1

Fe-P alloy, Fe-C alloy, Fe and Ru were weighed for obtaining the composition of 78 at % Fe, 2 at % Ru, 13 at % P and 7 at % C. A test sample of amorphous material in the form of strip was prepared in the same manner as in the Comparison Example 1. The characteristics such as the magnetostriction coefficient were measured in the above described manner. The results are shown in Table 1.

EXAMPLE 2

A test sample of amorphous material having the composition of 76 at % Fe, 4 at % Ru, 13 at % P and 7 at % C was prepared in the manner described in the Comparison Example 1. The characteristics such as the magnetostriction coefficient were measured. The results are shown in Table 1. The ring sample was annealed at the temperature of 340° C. for one hour. Its effective permeability $\mu e$ was measured before and after the resin molding. The change of the effective permeability $\mu e$ due to the resin molding is shown in FIG. 2.

Comparison Example 1. As understood from Table 1, the magnetostriction coefficient $\lambda$ decreases in accordance with the added amount of Ru, and the crystallization temperature increases in accordance with the added amount of Ru. On the other hand, the magnetic Curie point Tc and the saturation magnetic flux density Bs decrease in accordance with the added amount of Ru. However, the decreases of the magnetic Curie point and saturation magnetic flux density are not very essential from the viewpoint of the desirable characteristic of the amorphous magnetic material according to this invention.

Figure 2:
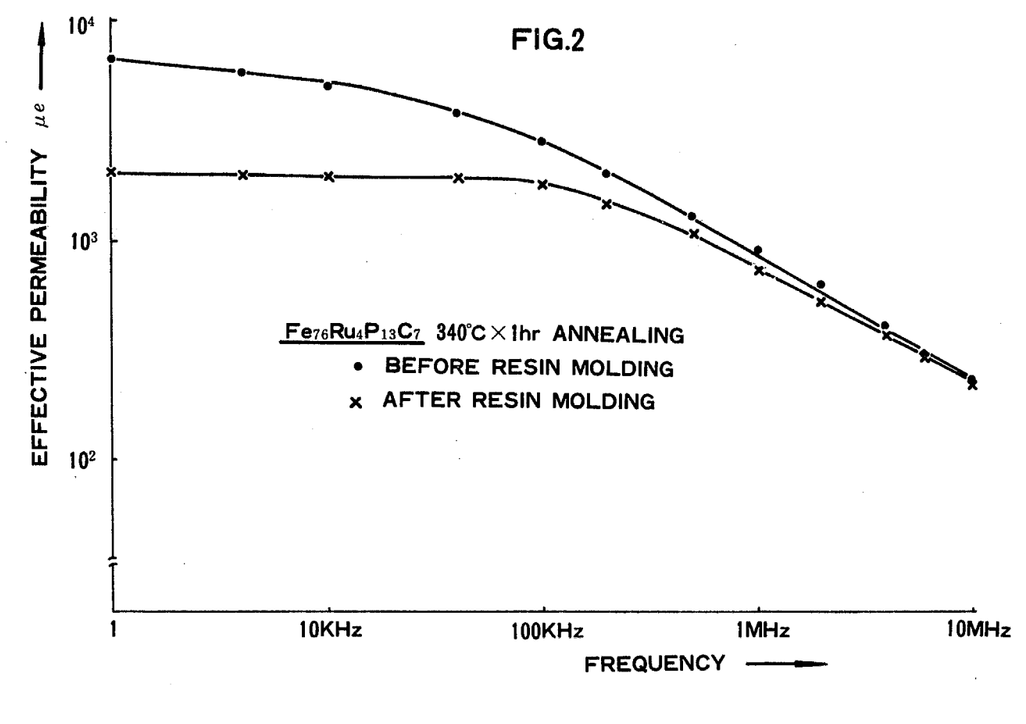
FIG. 2 to FIG. 5 are graphs showing the dependences of the effective permeabilities $\mu e$ of amorphous magnetic materials of the respective examples of this invention on frequencies before and after resin molding.
Figure 3:
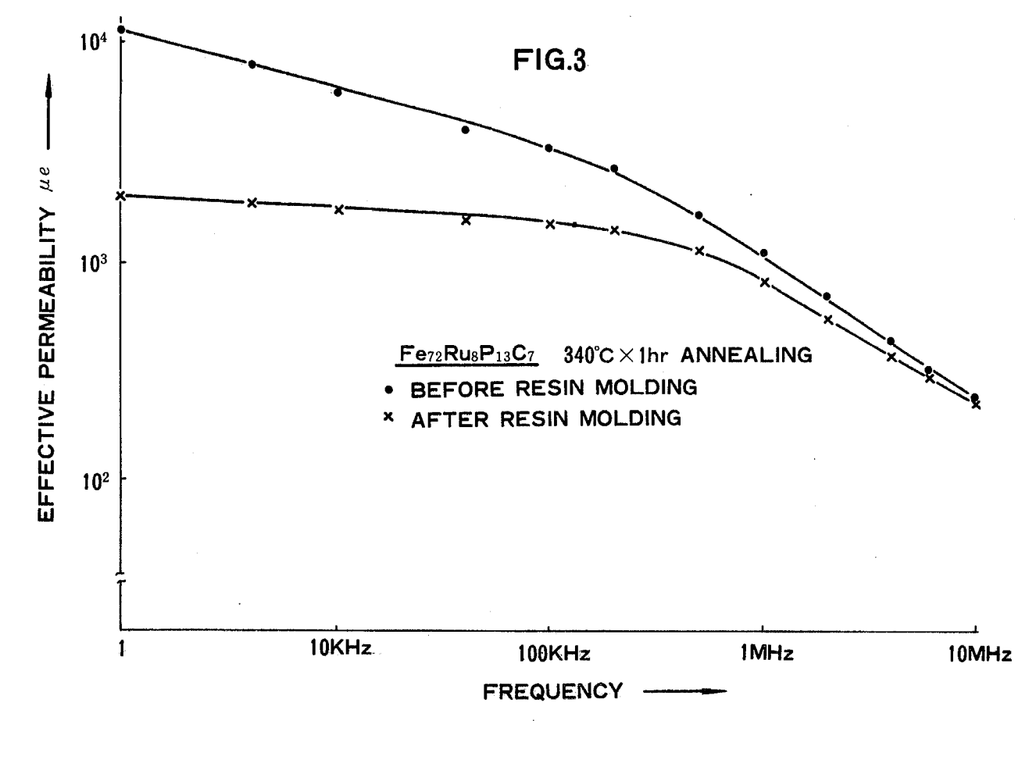

Further, as understood from the graphs of FIG. 1 to FIG. 3, the change of the effective permeability $\mu e$ due to the resin molding is remarkably reduced with the addition of Ru in comparison with the Comparison Example 1. As understood from FIG. 1, the effective permeability $\mu e$ of the Comparison Example 1 before the resin molding is reduced to about one third after the resin molding, in the lower frequency region, and it is reduced to about three fifths in the higher frequency region. On the other hand, as understood from FIG. 2 and FIG. 3, the effective permeability $\mu e$ of the Examples 2 and 3 of this invention before the resin molding is reduced to about two fifths after the resin molding, in the lower frequency region, and it is reduced to about Table 1

|  | Composition (at%) | $\lambda \times 10^6$ | Tc (°C.) | Tcry (°C.) | $\sigma g$ (emu/g) | $B_s$ (Gauss) | Hv | $\rho$ ($\mu\Omega$ cm) |
|---|---|---|---|---|---|---|---|---|
| Comparison Example 1 | $Fe_{80}P_{13}C_7$ | 33 | 315 | 410 | 154 | 14,200 | 850 | 151 |
| Example 1 | $Fe_{78}Ru_2P_{13}C_7$ | 26 | 288 | 416 | 137 | 12,600 | 850 | 140 |
| Example 2 | $Fe_{76}Ru_4P_{13}C_7$ | 21 | 253 | 420 | 130 | 12,000 | 860 | 145 |
| Example 3 | $Fe_{74}Ru_6P_{13}C_7$ | 16 | 217 | 430 | 118 | 11,000 | 870 | 144 |
| Example 4 | $Fe_{72}Ru_8P_{13}C_7$ | 12 | 180 | 435 | 104 | 97,00 | 870 | 140 |

$\lambda$ Magnetostriction coefficient
Tc Magnetic Curie temperature
Tcry Crystallization temperature
$\sigma g$ Spontaneous magnetization
Bs Saturation magnetic flux density
Hv Vickers hardness
$\rho$ specific resistivity

EXAMPLE 3

A test sample of amorphous material having the composition of 74 at % Fe, 6 at % Ru, 13 at % P and 7 at % C was prepared in the manner described in the Comparison Example 1. The characteristics such as the magnetostriction coefficient were measured. The results are shown in Table 1.

EXAMPLE 4

A test sample of amorphous material having the composition of 72 at % Fe, 8 at % Ru, 13 at % P and 7 at % C was prepared in the manner described in the Comparison Example 1. The characteristics such as the magnetostriction coefficient were measured. The results are shown in Table 1. The ring sample was annealed at the temperature of 340° C. for one hour. Its effective permeability $\mu e$ was measured before and after the resin molding. The change of the effective permeability $\mu e$ due to the resin molding is shown in FIG. 3.

The following facts will be understood from the above described results:

The magnetostriction coefficients $\lambda$ of the Examples 1 to 4 of this invention are remarkably reduced in comparison with the magnetostriction coefficient $\lambda$ of the Comparison Example 1. Particularly, the magnetostriction coefficient $\lambda$ of the Example 4 of this invention is less than half of the magnetostriction coefficient $\lambda$ of the five sixths after the resin molding in the higher frequency region. The effective permeabilities $\mu e$ of the Examples 2 and 3 of this invention are larger than the effective permeability $\mu e$ of the Comparison Example 1, both before and after the resin molding. The reason is considered to be the decrease of the magnetostriction coefficient $\lambda$.

Comparison Example 2

Fe-B alloy, Fe and Si were mixed to obtain amorphous material having the composition of 78.1 at %, 5.9 at % Si and 16 at % B. A test sample was prepared in the same manner as in the Comparison Example 1. The characteristics such as the magnetostriction coefficient $\lambda$ were measured. The results are shown in Table 2.

EXAMPLE 5

Figure 4:
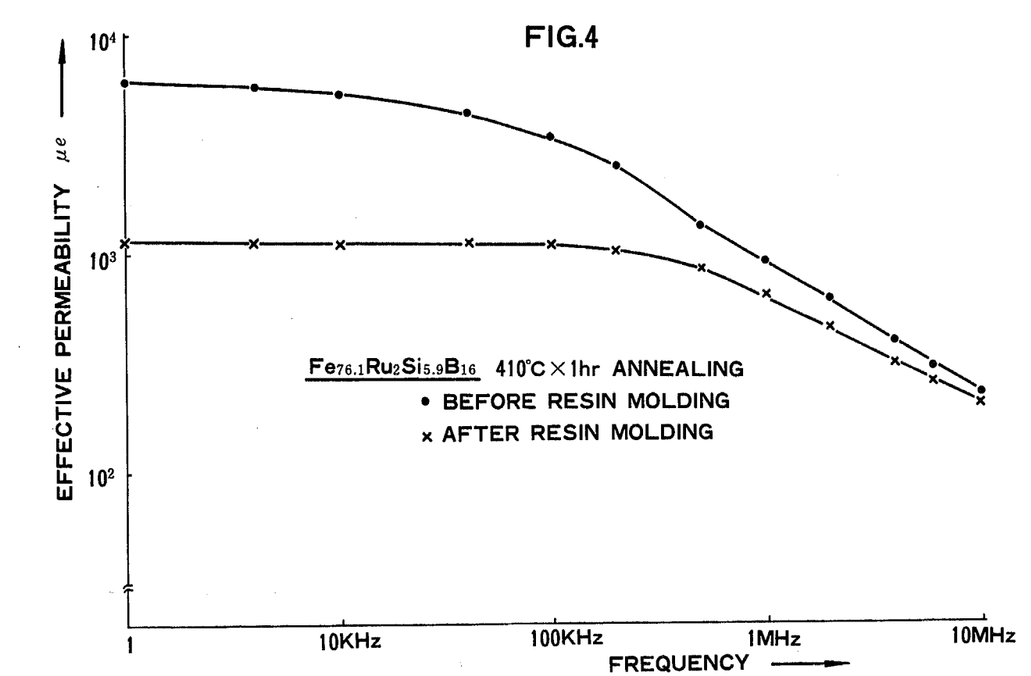

A test sample of amorphous material having the composition of 76.1 at % Fe, 2 at % Ru, 5.9 at % Si and 16 at % B was prepared in the same manner as in the Comparison Example 1. The characteristics such as the magnetostriction coefficient $\lambda$ were measured. The results are shown in Table 2. The ring sample was annealed at the temperature of 410° C. for one hour. And the change of the effective permeability $\mu e$ due to the resin molding was measured. The results are shown in FIG. 4.

EXAMPLE 6

A test sample of amorphous material having the composition of 74.1 at % Fe, 4 at % Ru, 5.9 at % Si and 16 at % B was prepared in the same manner as in the Comparison Example 1. The characteristics such as the magnetostriction coefficient $\lambda$ were measured. The results are shown in Table 2.

EXAMPLE 7 magnetic flux density of the Examples 5 to 9 are slightly larger than those of the Examples 1 to 4.

Figure 5:
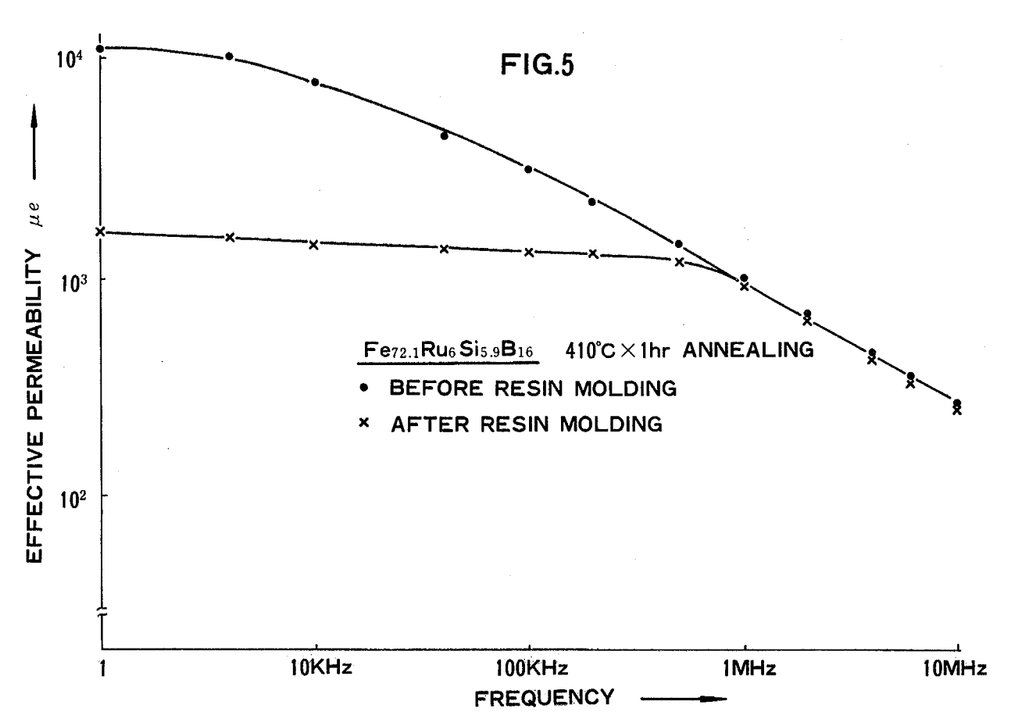

As understood from FIG. 4 and FIG. 5, the changes of the effective permeabilities $\mu e$ of the Examples of this invention are greatly reduced in comparison with the Comparison Example of FIG. 1.

Comparison Example 4

A test sample of amorphous material having the composition of 63 at % Fe, 15 at % Co, 10 at % Si and 12 at % B was prepared in the same manner as in the Comparison Example 1.

Table 2

| | Composition (at%) | $\lambda \times 10^6$ | Tc (°C.) | Tcry (°C.) | $\sigma g$ (emu/g) | $B_s$ (Gauss) | Hv | $\rho$ $\mu\Omega$ cm |
|---|---|---|---|---|---|---|---|---|
| Comparison Example 2 | $Fe_{78.1}Si_{5.9}B_{16}$ | 35 | 428 | 507 | 174 | 15,800 | 980 | 133 |
| Example 5 | $Fe_{76.1}Ru_2Si_{5.9}B_{16}$ | 28 | 395 | 520 | 162 | 14,800 | 980 | 131 |
| Example 6 | $Fe_{74.1}Ru_4Si_{5.9}B_{16}$ | 21 | 345 | 520 | 141 | 12,900 | 980 | 130 |
| Example 7 | $Fe_{72.1}Ru_6Si_{5.9}B_{16}$ | 17 | 305 | 527 | 135 | 12,400 | 980 | 130 |
| Example 8 | $Fe_{70.1}Ru_8Si_{5.9}B_{16}$ | 12 | 258 | 529 | 124 | 11,500 | 990 | 130 |
| Comparison Example 3 | $Fe_{80}P_{15}Ge_5$ | 36 | 315 | 435 | 152 | 14,100 | 710 | 150 |
| Example 9 | $Fe_{76}Ru_4P_{15}Ge_5$ | 22 | 255 | 445 | 129 | 12,000 | 720 | 145 |

$\lambda$ Magnetostriction coefficient
Tc Magnetic Curie temperature
Tcry Crystallization temperature
$\sigma g$ Spontaneous magnetization
Bs Saturation magnetic flux density
Hv Vickers hardness
$\rho$ Specific resistivity A test sample of amorphous material having the composition of 72.1 at % Fe, 6 at % Ru, 5.9 at % Si and 16 at % B was prepared in the same manner as in the Comparison Example 1. The characteristics such as the magnetostriction coefficient $\lambda$ were measured. The results are shown in Table 2.

EXAMPLE 8

A test sample of amorphous material having the composition of 70.1 at % Fe, 8 at % Ru, 5.9 at % Si and 16 at % B was prepared in the same manner as in the Comparison Example 1. The characteristics such as the magnetostriction coefficient $\lambda$ were measured. The results are shown in Table 2.

Comparison Example 3

A test sample of amorphous material having the composition of 80 at % Fe, 15 % P, and 5 at % Ge was prepared in the same manner as in the Comparison Example 1. The characteristic such as the magnetostriction coefficient $\lambda$ were measured. The results are shown in Table 2.

EXAMPLE 9

A test sample of amorphous material having the composition of 76 at % Fe, 4 at % Ru, 15 at % P and 5 at % Ge was prepared in the same manner as in the Comparison Example 1. The characteristics such as the magnetostriction coefficient $\lambda$ were measured. The results are shown in Table 2.

As understood from Table 2, the magnetorestriction coefficients $\lambda$ of the Examples 5 to 9 of this invention are remarkably reduced in accordance with the added amount of Ru, in comparison with the Comparison Examples 2 and 3. Also the magnetic Curie temperature and saturation magnetic flux density of the Examples 5 to 9 change with the addition of Ru in the similar manner to those of the Examples 1 to 4. However, the values of the magnetic Curie temperature and saturation The characteristics such as the magnetostriction coefficient $\lambda$ were measusred. The results are shown in Table 3.

EXAMPLE 10

A test sample of amorphous material having the composition of 59 at % Fe, 15 at % Co, 4 at % Ru, 10 at % Si and 12 at % B was prepared in the same manner as in the Comparison Example 1. The characteristics such as the magnetostriction coefficient $\lambda$ were measured. The results are shown in Table 3.

Comparison Example 5

A test sample of amorphous material having the composition of 63 at % Fe, 15 at % Ni, 10 at % Si and 12 at % B was prepared in the same manner as in the Comparison Example 1. The characteristics such as the magnetostriction coefficient $\lambda$ were measured. The results are shown in Table 3.

EXAMPLE 11

A test sample of amorphous material having the composition of 59 at % Fe, 15 at % Ni, 4 at % Ru, 10 at % Si, and 12 at % B was prepared in the same manner as in the Comparison Example 1. The characteristics such as the magnetostriction coefficient $\lambda$ were measured. The results are shown in Table 3.

In the Examples 10 and 11, a part of Fe atoms is substituted with Co and Ni atoms. As understood from Table 3, the effect due to the addition of Ru, namely the decrease of the magnetostriction coefficient $\lambda$ is obtained in the Examples of this invention, in comparison with the Comparison Examples 4 and 5.

EXAMPLE 12

A test sample of amorphous material having the composition of 74 at % Fe, 3 at % Ru, 3 at % Cr, 13 at % P and 7 at % C was prepared in the same manner as in the Comparison Example 1. The characteristics such as the magnetostriction coefficient λ were measured. The results are shown in Table 4.

EXAMPLE 13

A test sample of amorphous material having the composition of 74 at % Fe, 3 at % Ru, 3 at % Mo, 13 at % P and 7 at % C was prepared in the same manner as in the Comparison Example 1. The characteristics such as the magnetostriction coefficient λ were measured. The results are shown in Table 4.

EXAMPLE 14

A test sample of amorphous material having the composition of 76 at % Fe, 2 at % Ru, 2 at % V, 13 at % P, and 7 at % C was prepared in the same manner as in the Comparison Example 1. The characteristics such as the magnetostriction coefficient λ were measured. The results are shown in Table 4.

EXAMPLE 15

A test sample of amorphous material having the composition of 72.1 at % Fe, 3 at % Ru, 3 at % Cr, 5.9 at % Si, and 16 at % B was prepared in the same manner as in the Comparison Example 1. The characteristics such as the magnetostriction coefficient λ were measured. The results are shown in Table 4.

EXAMPLE 16

A test sample of amorphous material having the composition of 72.1 at % Fe, 3 at % Ru, 3 at % Mo, 5.9 at % Si and 16 at % B was prepared in the same manner as in the Comparison Example 1. The characteristics such as the magnetostriction coefficient λ were measured. The results are shown in Table 4.

EXAMPLE 17

A test sample of amorphous material having the composition of 72.1 at % Fe, 3 at % Ru, 3 at % Mn, 5.9 at % Si and 16 at % B was prepared in the same manner as in the Comparison Example 1. The characteristics such as the magnetostriction coefficient λ were measured. The results are shown in Table 4.

As understood from Table 4, in the Examples 12 to 17, a part of Ru atoms within the range of 2 to 20 at % according to this invention is substituted with Cr, Mo, V or Mn. The magnetostriction coefficients λ of the Examples 12 to 17 are further smaller than thoes of the Comparison Examples 1 and 2. It will be seen that, the Examples in which a part of Ru atoms within the range of 2 to 20 at % according to this invention is substituted with Cr, Mo, V or Mn have substantially the same effect as the Examples in which only Ru atoms are contained with the range of 2 to 20 at % according to this invention.

Although the Examples of the invention have been described in detail herein with reference to the accompanying drawings, it is to be understood that the invention is not limited to those precise Examples, and that various changes and modifications can be effected therein by one skilled in the art without departing from the scope and spirit of the invention as defined in the appended claims.

Table 4

|  | Composition (at%) | $\lambda \times 10^6$ | Tc (°C.) | Tcry (°C.) | σg (emu/g) | Bs (Gauss) | Hv | ρ (μΩ cm) |
|---|---|---|---|---|---|---|---|---|
| Example 12 | $Fe_{74}Ru_3Cr_3P_{13}C_7$ | 16 | 205 | 425 | 112 | 10,400 | 860 | 135 |
| Example 13 | $Fe_{74}Ru_3Mo_3P_{13}C_7$ | 15 | 192 | 430 | 108 | 10,000 | 850 | 138 |
| Example 14 | $Fe_{76}Ru_2V_2P_{13}C_7$ | 21 | 263 | 420 | 135 | 12,500 | 860 | 142 |
| Example 15 | $Fe_{72.1}Ru_3Cr_3Si_{5.9}B_{16}$ | 15 | 285 | 525 | 130 | 11,800 | 970 | 130 |
| Example 16 | $Fe_{72.1}Ru_3Mo_3Si_{5.9}B_{16}$ | 14 | 280 | 530 | 125 | 11,400 | 960 | 135 |
| Example 17 | $Fe_{72.1}Ru_3Mn_3Si_{5.9}B_{16}$ | 16 | 295 | 530 | 135 | 12,200 | 960 | 140 |

λ Magnetostriction coefficient
Tc Magnetic Curie temperature
Tcry Crytallization temperature
σg Spontaneous magnetization
Bs Saturation magnetic flux density
Hv Vickers hardness
ρ Specific resistivity Table 3

|  | Composition (at %) | $\lambda \times 10^6$ | Tc (°C.) | Tcry (°C.) | σg (emu/g) | $B_s$ (Gauss) | Hv | ρ (μΩ cm) |
|---|---|---|---|---|---|---|---|---|
| Comparison Example 4 | $Fe_{63}Co_{15}Si_{10}B_{12}$ | 35 | 520 | 510 | 177 | 16,700 | 940 | 140 |
| Example 10 | $Fe_{59}Co_{15}Ru_4Si_{10}B_{12}$ | 22 | 420 | 520 | 140 | 13,200 | 950 | 143 |
| Comparison Example 5 | $Fe_{63}Ni_{15}Si_{10}B_{12}$ | 20 | 460 | 500 | 140 | 13,200 | 930 | 145 |
| Example 11 | $Fe_{59}Ni_{15}Ru_4Si_{10}B_{12}$ | 11 | 360 | 515 | 110 | 10,400 | 930 | 143 |

λ Magnetostriction coefficient
Tc Magnetic Curie temperature
Tcry Crystallization temperature
σg Spontaneous magnetization
$B_s$ Saturation magnetic flux density
Hv Vickers hardness
ρ Specific resistivity

What is claimed is:
1. An amorphous magnetic alloy consisting essentially of:
 (A) from 2 to 20 atomic % ruthenium;
 (B) from 10 to 30 atomic % of at least one amorphous element selected from the group consisting of phosphorus, carbon, silicon, boron, and germanium;
 (C) from 0 to 20 atomic % cobalt, nickel, or mixtures of the two, and
 (D) the balance being at least 70 atomic % iron.
2. An amorphous magnetic alloy according to claim 1, in which the atoms of said at least one amorphous forming element are contained within the range of 15 to 28 at %.

3. An amorphous magnetic alloy according to claim 1, in which, when the contents of phosphorus (P), carbon (C), silicon (Si), boron (B), and germanium (Ge) as said amorphous forming element are expressed by $P_v C_w Si_x B_y Ge_z$, where $v+w+x+y+z=1$, they are within the following ranges, respectively: $v \leq 1$, $w \leq 0.7$, $x \leq 0.7$, $y \leq 1$ and $z \leq 0.7$.

4. An amorphous magnetic alloy according to claim 3, in which only silicon and boron are present as said amorphous forming elements and are contained in the ratio of 75/25 to 5/95.

* * * * *